United States Patent [19]

Hornby et al.

[11] 4,269,712
[45] May 26, 1981

[54] HOLLOW FIBER SEPARATORY ELEMENT AND METHOD OF MAKING SAME

[75] Inventors: Roger B. Hornby; Bennie J. Lipps, both of Walnut Creek; Charles E. Savage, Clayton, all of Calif.

[73] Assignee: Cordis Dow Corp., Miami, Fla.

[21] Appl. No.: 39,066

[22] Filed: May 14, 1979

[51] Int. Cl.³ .................................................. B01D 13/00
[52] U.S. Cl. .................................. 210/321.3; 210/450; 210/433.2; 264/159; 156/166
[58] Field of Search ................. 210/22, 321 R, 321 B, 210/433 M; 55/16, 158; 422/48; 264/159, 251, 263, 328; 156/166

[56] References Cited

U.S. PATENT DOCUMENTS

| | | | |
|---|---|---|---|
| 3,277,959 | 10/1966 | Withers | 165/159 |
| 4,001,110 | 1/1977 | Geen et al. | 210/321 B |
| 4,075,100 | 2/1978 | Furuta et al. | 210/456 |
| 4,108,764 | 8/1978 | Kaneko et al. | 210/321 A |
| 4,125,468 | 11/1978 | Joh et al. | 210/456 |
| 4,138,460 | 2/1979 | Tigner | 264/328 |
| 4,148,606 | 4/1979 | Morita et al. | 422/48 |

FOREIGN PATENT DOCUMENTS 1175124  12/1969  United Kingdom .................... 210/321

*Primary Examiner*—Charles N. Hart
*Assistant Examiner*—E. Rollins Cross
*Attorney, Agent, or Firm*—Neal A. Waldrop

[57] ABSTRACT

A hollow fiber separatory element of the type having a plurality of hollow semipermeable fibers terminating at their end portions in resin tubesheets; each tubesheet has a disc-shaped portion that tapers radially inwardly toward its inner end surface that serves as a pressure-induced sealing surface when forced into contact with a correspondingly tapered surface on the inner wall of a surrounding jacket. Each tubesheet optionally includes a second tapered portion that extends outwardly from the outer end face of the disc portion and its peripheral surface tapers radially inwardly toward the outer end planar surface which exposes the open ends of the fibers therein. The tubesheet disc portion may be circular, lenticular, elliptical or have other selected shape.

The invention includes a hollow fiber medical separatory device which incorporates the new separatory element by a pressure type mechanical seal between the inner end surface of the disc portion of the tubesheet and a radially and axially inwardly extending tapering inner wall surface of the surrounding jacket of the device.

The improved method relates to forming the new separatory element tubesheets by centrifugally casting a thermoplastic resin around the ends of the fibers in unique molds which enable uniform resin penetration and fiber wetting, and solidification of the molten cast resin into a sound and substantially void-free tubesheet having selected tapers.

13 Claims, 6 Drawing Figures

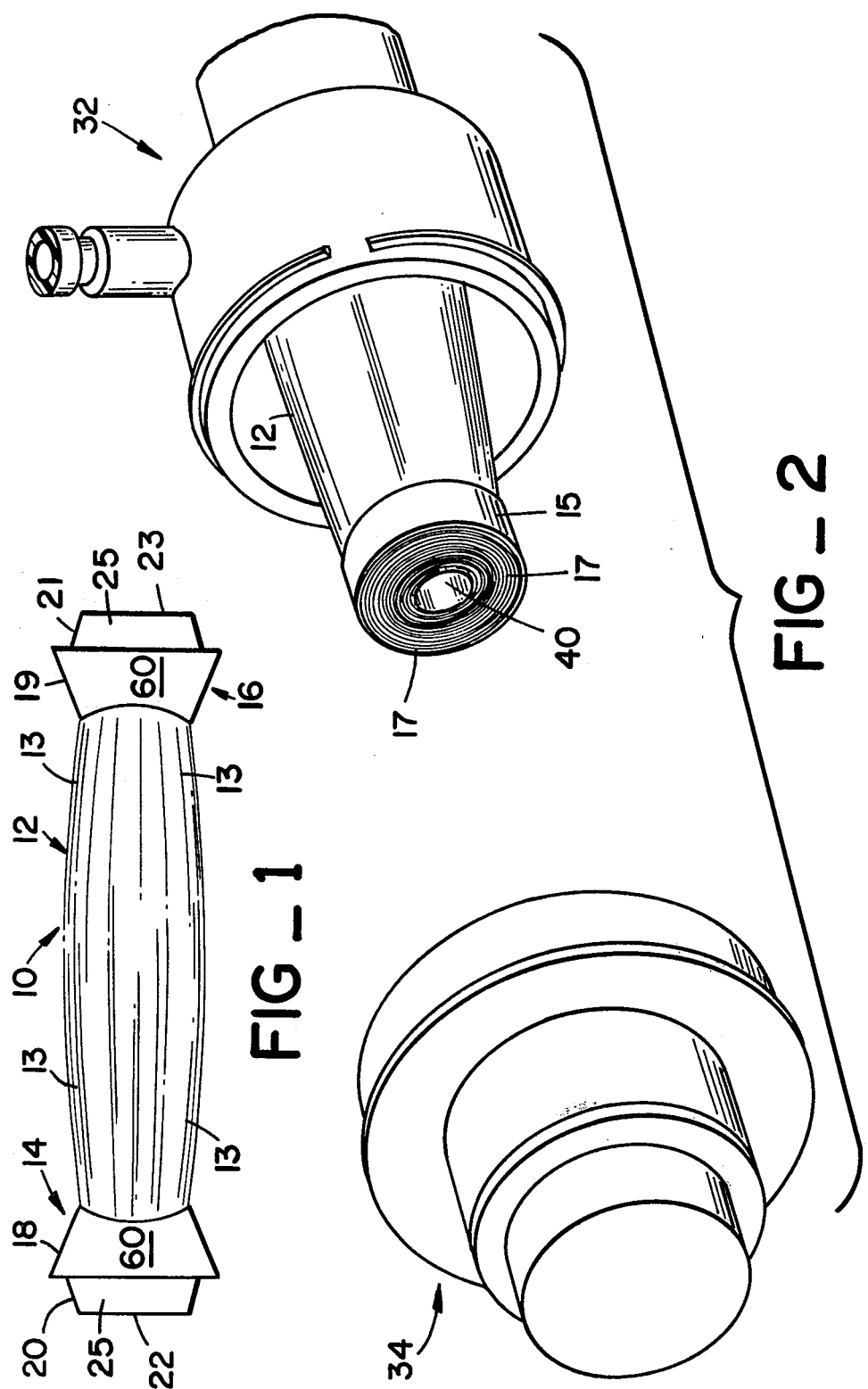

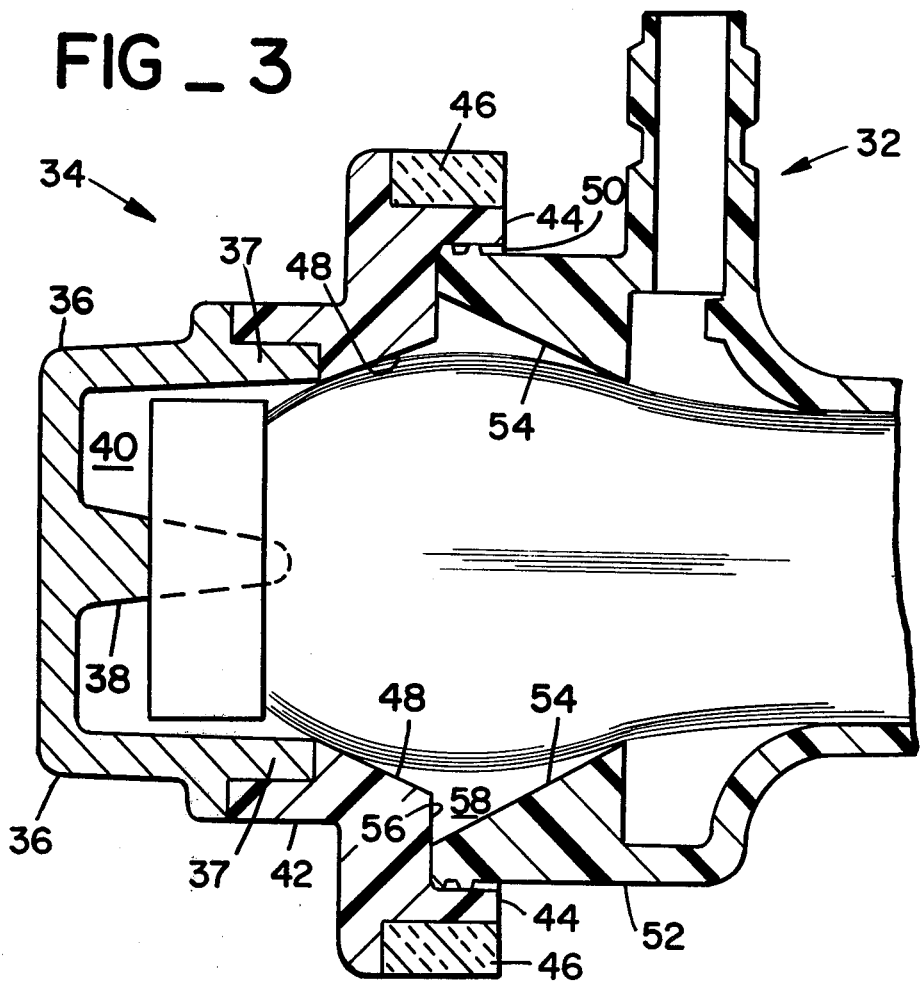
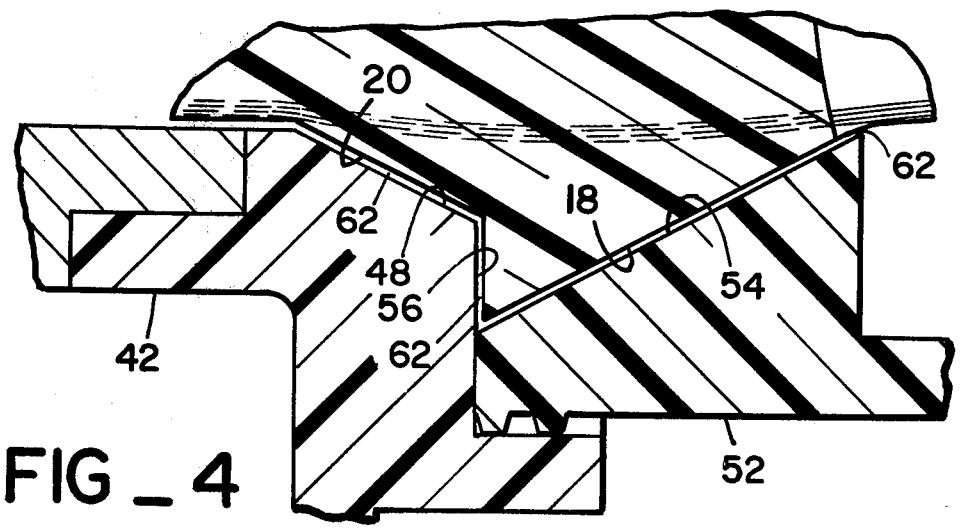

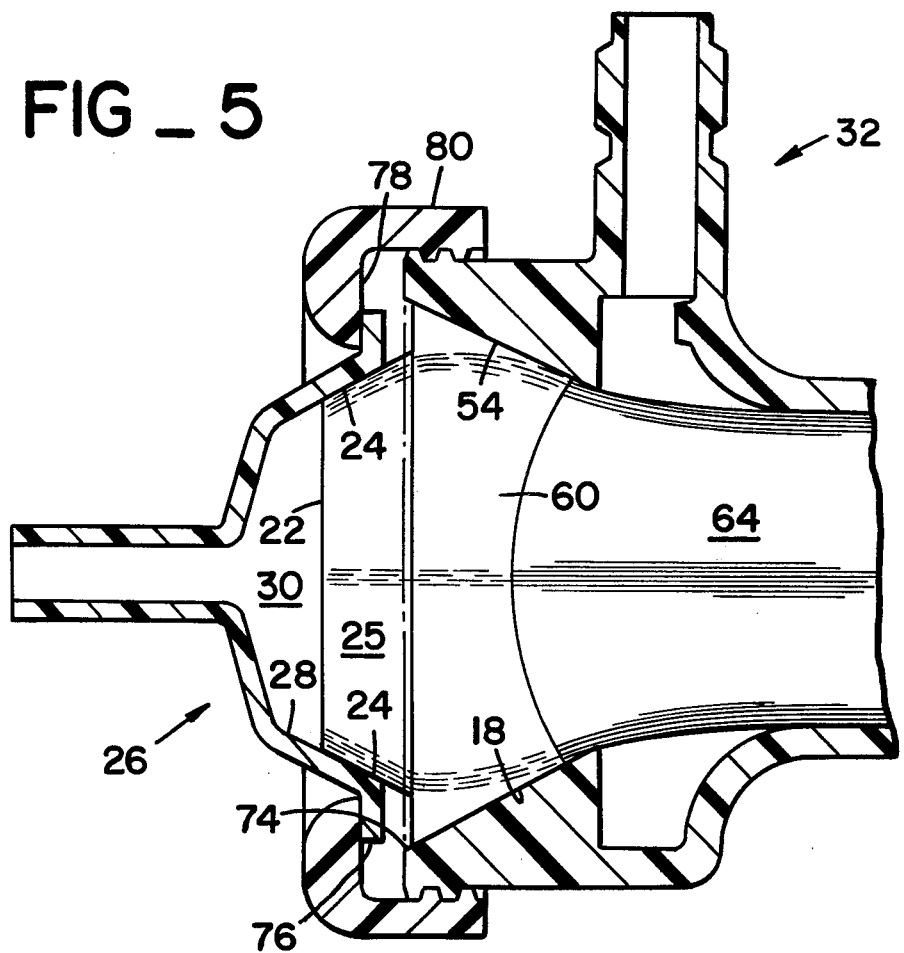
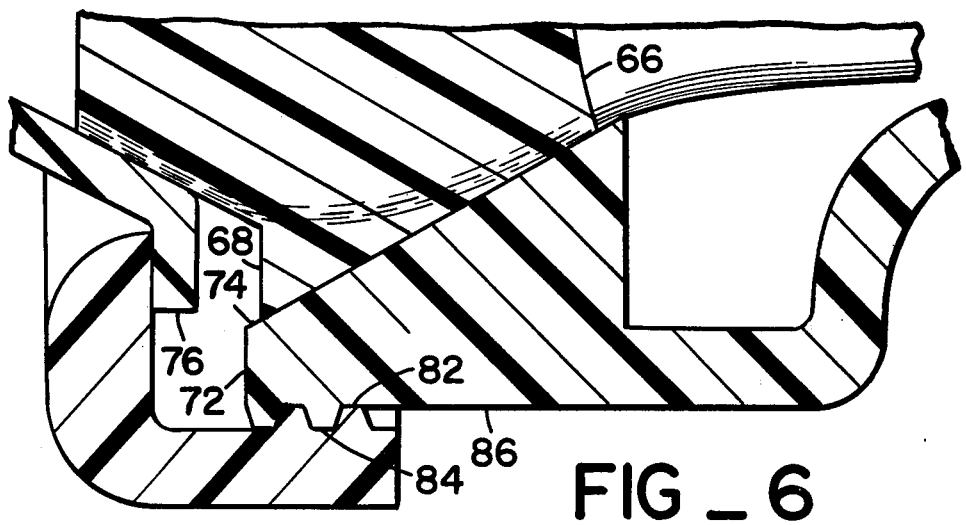

HOLLOW FIBER SEPARATORY ELEMENT AND METHOD OF MAKING SAME

BACKGROUND OF THE INVENTION

This invention relates to improvements in hollow semipermeable fiber elements of the type disclosed in Mahon U.S. Pat. No.3,228,876. Such elements are adapted for use in industrial osmosis, ultrafiltration or dialysis processes, and are particularly useful in medical applications including blood oxygenation, and purification by hemodialysis or hemofiltration.

Mahon type semipermeable fiber elements have achieved their greatest commercial utilization in artificial kidney devices having the general configuration of a tube and shell heat exchanger similar to that shown in U.S. Pat. No. 3,228,377. Such devices couple, or seal, the hollow fiber bundle into a tubular shell by using a solidified castable resin tubesheet on each end of the fiber bundle and sealing the outer rim of the tubesheet to the inner wall of the shell. The outer end of the tubesheet is transversely severed to form an outer end planar surface which exposes the open fiber ends, and that planar surface then becomes the inner wall of an outwardly extending contiguous blood chamber.

Tubesheets for artificial kidneys are typically formed by centrifugally casting a castable synthetic resin around the fiber end portions while the fiber bundle is positioned within the shell such that the casting resin solidifies within the end portions of the shell and concurrently adheres to and seals the rim portion of the solid tubesheet to the inner walls of the shell. This procedure has been successful for combinations of certain resin shells and certain castable resins adhesive to those shells, notably thermosetting resins of the epoxy and polyurethane type as disclosed in U.S. Pat. Nos. 3,619,459; 3,703,962; and 3,962,094. Prior to this invention, however, to our knowledge, no one has successfully employed thermoplastic resins in a process of centrifugally casting tubesheets in the manufacture of artificial kidneys. The only known use of thermplastic resins in artificial kidney tubesheet manufacture is that disclosed in Tigner U.S. Pat. No. 4,138,460.

It has long been recognized that thermoplastic resins offer advantages as tubesheets for hollow fibers that are not possessed by thermosetting resins. Thermoplastic resins offer faster potting cycle times than thermosetting resins and thereby reduce the overall production time required to manufacture an artificial kidney ready for testing; thermoplastic resins are free from noxious vapor or gas generation during casting which may occur with certain epoxy and polyurethane resins; thermoplastic resins are cheaper than thermosets and thermoplastic tubesheet-shell devices can be ethylene oxide sterilized easier and in less time than corresponding thermoset tubesheet-shell devices.

On the other hand thermoplastic resins have entirely different handling characteristics than thermosetting tubesheet resins and these characteristics have, prior to this invention, prevented successful adoption of thermoplastics for centrifugal casting of hollow fiber tubesheets. The handling characteristics referred to stem from the basic reaction of thermoplastics to temperature changes and this reaction creates formidable problems when combined with the necessity to penetrate between and to wet the external wall surfaces of thousands of capillary size hollow fibers and thereafter to solidify into a sound, internal-void-free tubesheet. Epoxy and polyurethane resins or polymers, become polymers by chemical reaction between initially fluid multi-components, or comonomers, and generate heat during reaction; the generated heat causes the reaction product to solidify, or set, at or above some high threshold temperature. In contrast, thermoplastic resins are polymers that are solid at room temperature but soften and become liquid as the temperature rises past a threshold value; molten thermoplastic resins then solidify as the temperature is reduced and passes through the threshold temperature on the way back down toward room temperature. Thermoplastics also have a substantially greater shrinkage during solidification than thermosetting resins. Thus, translating these thermoplastic resin characteristics into required handling conditions during centrifugal casting, it is necessary to, first, raise the temperature of the selected thermoplastic resin to convert it into a liquid, preferably a low viscosity liquid, and during casting to control the temperature of the entire molten mass of resin so as to insure penetration into and around each fiber in the bundle; the condition that must be avoided is localized temperature drop below the solidification threshold temperature and a resultant flow blockage anywhere in the inflow path of the resin prior to the arrival of liquid resin at the furthermost contemplated point from the infeed location. Second, the shrinkage of the mass of the cast liquid resin confined within a mold during solidification must be controlled so as to counteract the resin tendency to contract from the liquid pool toward each solidifying location in the mass. It is also necessary to recognize that the volume of thermoplastic resin shrinkage is so great that it has not been found to be possible to solidify a disc-shaped tubesheet within a tubular shell and retain a sound, non-fractured, adhesion seal between the rim of the tubesheet and the inner wall of the shell as is routinely achieved with the commercially used thermosetting tubesheet resin compositions. This failure of the thermoplastic tubesheet to adhere to the tubular shell wall is serious because it necessitates formation of a separate seal between the shell and tubesheet in some other fashion to separate the shell into the desired three separate fluid-tight isolated zones, e.g., in the case of an artificial kidney, a central dialysate zone between two spaced apart end blood chambers.

In artificial kidneys employing thermosetting resin tubesheets it is conventional to form the blood chambers by sealing a generally cup-shaped member against the planar outer end surface of the tubesheet by a conventional circular O-ring as illustrated in FIG. 4 of U.S. Pat. No. 3,882,024. With thermoplastic tubesheets, such blood chamber constructions are not feasible due to inability to form an effective seal between the thermoplastic tubesheet and the inner shell wall.

Prior to this invention all of the problems above identified have remained unsolved.

It is therefore the principal object of this invention to provide an iimproved hollow fiber semipermeable membrane separatory element having an integral tubesheet on each end of a solidified castable resin; each tubesheet has a solid, axially extending disc section terminating in an outer end planar surface exposing the open ends of the fibers therein, and a radially outwardly tapering surface extending from the inner end surface toward the outer portion thereof; the tubesheet optionally includes a second tapered portion that extends outwardly from the outer face of the disc portion and its peripheral surface tapers radially inwardly toward the outer end planar surface which exposes the open ends of the fibers therein.

A second important object is to provide a separatory device which incorporates the new separatory element of this invention and provides improved means for sealing that element into a surrounding shell, or jacket.

Another object of this invention is to provide a method suitable for centrifugally casting thermoplastic castable resin tubesheets on each end of a bundle of hollow semipermeable fibers to form the new separatory element of this invention.

SUMMARY OF THE INVENTION

The improved hollow fiber semipermeable membrane separatory element comprises a bundle of continuously hollow semipermeable fibers having a solidified castable resin tubesheet on each terminal portion which joins the exteriors of the fibers to each other in a solid tubesheet. The tubesheet has a axially extending disc portion which terminates in an outer end planar surface exposing the open ends of the fibers therein. On its opposite, or inner end, the disc portion tapers from the inner end axially and radially outwardly for at least a portion of the length of the axial extent of the inner portion of the disc section of the tubesheet. The tubesheet may include a frusto-tapered outwardly extending portion, the periphery of which tapers radially inwardly from the disc section and the outer end of the frustum becomes the outer planar surface of the tubesheet which exposes the open fiber ends; the hollow fibers are confiined to the axial center portions and extend through both the disc portion and the frusto-tapered portion and are oriented generally parallel, or spirally around the axis, so that the disc portion includes an outer annular rim free of fibers and the fibers extend substantially to the outer edge, or periphery, of the frusto-tapered portion, at least at the outer end planar surface of the frustum.

The improved sealing means between a surrounding jacket, or shell, and the peripheral surface of a tubesheet consists of a radially inwardly extending tapered section on the inner wall of the jacket, or shell, the seal reulting from pressure urging the peripheral tubesheet wall axially inwardly to effect a liquid and gas tight sealing of the tubesheet wall against the tapered shell, or jacket, surface.

The improved method of centrifugally casting thermoplastic resin tubesheets on each end of a bundle of hollow fibers adds to conventional centrifugal casting process steps the concurrent temperature control of the fibers relative to the temperature of the molten thermoplastic resin during centrifugal rotation to achieve fiber penetration and temperature control of the cast resin mass so as to cause progressive solidification in the direction from the outer edge surfaces and the outer end portion of the cast resin axially and radially inwardly in said frusto-tapered portion and thereafter into the adjacent disc portion with the last portion to solidify being the axial center portion of the disc.

BRIEF DESCRIPTION OF THE DRAWINGS

FIG. 1 is a side view of one embodiment of the improved separatory element of this invention;

FIG. 2 is an exploded schematic view showing the parts used in the centrifugal casting process prior to assembly and including, from right to left, the jacket containing the tapered cavity, the outwardly extending fiber bundle, and the end mold;

FIG. 3 is a cross sectional view of the parts assembled in the end mold preparatory to centrifugal casting;

FIG. 4 is a fragmentary cross section similar to FIG. 3 showing the solidified tubesheet after cooling and shrinkage from adjacent molding surfaces;

FIG. 5 is a cross section showing the new element of this invention in sealed assembly in the jacket in which centrifugal casting of the tubesheets was effected; and FIG. 6 is a fragmentary enlarged cross sectional view showing the sealing means in the lower wall section of the device of FIG. 5.

DETAILED DESCRIPTION OF THE INVENTION

The improved separatory element of this invention as illustrated by the embodiment thereof generally designated 10 and shown in FIG. 1 comprises a bundle of fibers generally designated 12 having their terminal portions secured together in tubesheets generally designated 14 and 16. Tubesheets 14 and 16, which are of similar configuration and construction, consist of a disc-shaped portion 18 and 19 and a frusto-tapered portion 20 and 21, as shown.

The fibers 13 in bundle 12 are continuously hollow semipermeable, fine, capillary size fibers having selected permeability to best provide the desired separation such as removal of solute from liquids as in ultrafiltration or dialysis, the removal of water or other fluid portions and dissolved solutes from blood as in hemofiltration, or the introduction of oxygen into blood as in blood oxygenation. Such fibers are generally of the type disclosed in U.S. Pat. Nos. 3,228,876; 3,423,491 and 3,532,527 when the separation involves ultrafiltration or dialysis, particularly hemodialysis, and include cellulose made by deacetylating cellulose acetate as taught in U.S. Pat. No. 3,546,209 or cellulose made by the cuprammonium process, or cellulose acetate, or other cellulose esters, or polyesters, or polyamides; for hemofiltration the fibers may be any protein-retentive semipermeable fiber such as cellulose acetate or anisotropic fibers of the type disclosed in U.S. Pat. No. 3,615,024; fibers for oxygenating blood may be of the polyorganosilaxane type disclosed in U.S. Pat. No. 3,798,185.

Fiber bundle 12 includes a plurality of individual fibers 13 which extend between tubesheets 14 and 16 and the open end of each fiber terminates in the outer end planar surface 22 and 23 of frusto-tapered portions 20 and 21, respectively. The numbers of fibers 13 in a bundle 12 varies widely depending on contemplated end use, for example between about 3,000 and 30,000, and for medical applications normally varies between about 5,000 and about 20,000. Fiber size is also variable but typically is in the range of about 50 to about 400 microns internal diameter with a wall thickness in the range of about 10 to about 80 microns.

Tubesheets 14, 16 as shown in FIG. 1 represent the preferred embodiment of the new element of this invention and disc portions 18 and 19 thereof are shown as circular in cross section, and frusto-tapered portions 20 and 21 are shown as frustums of a cone; but it is to be understood that their shapes are illustrative only and that other shapes are satisfactory and benefit from the improved features of the preferred embodiment of FIG. 1. Equally useful shapes for tubesheets 14, 16 include lenticular, elliptical or combinations of other curvilinear or flat wall portion or sections which collectively define any of the cross sectional shapes illustrated in FIG. 3 and FIGS. 6–10 inclusive of Tigner U.S. Pat. No. 4,138,460, or the like, the teachings of which are specifically incorporated herein; it will be further appreciated that frusto-tapered portions 20, 21, in each instance, project outwardly from tubesheets 14 and 16 and radially inwardly to form an outer planar surface of the frustum having a similar cross sectional shape to that of the disc portion with which it is integral. In terms of difference from heretofore known centrifugally cast tubesheets for hollow fiber devices the outwardly projecting frusto-tapered portions 20, 21 are new and serve two important new functions. First, portions 20, 21 gather, or confine, all of the hollow fibers 13 into the radially inwardly tapering portions such that open fiber ends cover substantially entirely the outer end planar surfaces 22, 23. Second, the tapered periperal wall surface portions 20, 21 provide sealing surface area 24 for pressure sealing engagement with a cup-shaped correspondingly tapered blood chamber forming means generally designated 26, as shown in FIG. 5. The wall 28 of means 26 seals against portions 20, 21 to thereby form blood cavity 30. Fibers 13 located adjacent to the edge areas of planar surfaces 22, 23 eliminates the opportunity for blood clotting in stagnant areas which are sometimes present in blood chambers formed by previously used procedures of sealing a header to a planar tubesheet surface of disc portion 18, 19 by an O-ring seal of the type shown in FIG. 4 of U.S. Pat. No. 3,882,024. A further advantageous result is that the tapered outer surface 20, 21 permits a blood, or fluid tight seal with the surrounding header 26 which is deformable thereagainst in elongated area 24 by a combination of radial and axial force which insures maintenance of a fluid tight seal in case of creep and a seal independent of the type of seal between the inner surface of the jacket and the outer surface of disc portion 18, 19 as will be explained in greater detail in connction with the device shown in FIGS. 5 and 6.

Element 10 may satisfactorily include tubesheets 14, 16 centrifugally cast from any of a large number of satisfactory thermosetting resin compositions, for example, epoxy resins identified in U.S. Pat. Nos. 3,619,459 and 3,703,962 or polyurethane resins identified in U.S. Pat. Nos. 3,962,094 and 3,708,071 and the resultant elements are a part of this invention. Copending application Ser. No. 39,087, owned by the assignee of this application and filed concurrently with this application, describes an improved process and molding apparatus for centrifugally casting tubesheets 14, 16 with a thermosetting resin on a bundle of cellulose fibers which employs means and procedures that insure fibers centered in the frusto-conical portion of the resultant tubesheet.

The improved method of this invention is specific to a process for making tubesheets 14, 16 by the use of thermoplastic resins, as above stated. Since thermoplastic resin centrifugal casting is entirely distinct and different from thermosetting resin centrifugal casting, the requirements as to physical porperties of the resin, fibers, compatible materials fo use as jackets and molds, and the controlling operational parameters during casting and resin solidification will first be described in general terms to aid in selection of specific materials and conditions to enable one to design specific elements for specific end uses. Satisfactory thermoplastic resins must have low viscosity at temperatures in the range of about 100° C. to about 150° C. and in one preferred embodiment using cellulose acetate fibers and a polypropylene jacket the resins having a viscosity less than about 1500 centipoises at 135° C. were preferred. Such resin achieved penetration between the fine, capillary fibers without causing fiber wall collapse under the pressure of casting; the resins must wet and adhere to the fiber outer wall surfaces and must be non-adherent to the jacket, or shell, which contains the fiber bundle 12 during casting; the resins must solidify to solid form without voids, cracks or fractures in the cast shape and must possess resistance to loss of hardness tensile and compressive strength at temperatures normally encountered during shipment, storage or use, for example, up to temperatures of about 160° F. Additionally, the resin must be insufficiently brittle at room temperature to fracture or crack when transversely severed through the tapered frustum and the contained fibers. The presence of fibers throughout the tapered frustum, particularly those located at its peripheral edge surfaces at the plane of the transverse cut aids in fluid distribution and eliminating stagnant areas of fluid on that outer surface.

From the processing standpoint, in selecting fibers, care should be taken to select fibers with resistance to softening at temperatures approximating the melting point of the selected casting resin to thereby insure that the fibers substantially retain their circular cross section during casting; this is necessary because the fibers must be preheated to the approximate casting temperature prior to casting in order to prevent undesired resin solidification due to cooling upon contact with cold fiber surfaces. For elements of this invention that are to be used in artificial kidney devices which concurrently remove water and body poisons such as urea, creatinine, etc., during hemodialysis, a preferred fiber is cellulose acetate made by the process disclosed in Kell, et al copending application Ser. No. 972,090, filed Dec. 21, 1978. The jacket, or shell, and endmold must be fabricated from a material which does not adhere to the selected thermoplastic casting resin; alternatively, all surfaces thereof which contact the casting resin must be treated with a mold release agent, or material, to prevent such adhesion. In contrast to thermosetting resins which are selected for their strong adhesion properties to the selected shell, thermoplastic resins crack, fracture or disintegrate during shrinkage or cooling unless they are non-adherent to all contiguous retaining surface throughout their solidification. A preferred jacket, or shell, material which is non-adherent to many satisfactory thermoplastic castable resins without separate surface pretreatment is polypropylene. With a mold release agent pretreatment, any of the commercially used shell materials are satisfactory. Suitable mold release agents include waxes, polytetrafluoroethylene, and the like.

Generally stated, the above enumerated resin requirements are satisfied by the ethylene vinyl acetate copolymers, particularly the lower molecular weight, low viscosity resins of this type, for example, resins selected from those disclosed in U.S. Pat. Nos. 3,428,591 and 3,440,194. Specific identification of suitable resins and their properties are given in the Examples.

After selection of fibers, resin and jacket the steps of the method of this invention comprise inserting the bundle 12 into a jacekt, or shell, generally designated 32 FIG. 2, and inserting the assembled bundle and jacket into endmold 34 in preparation for centrifugal casting. The 8,000 to 10,000 fibers in bundle 12 may be formed on a conventional beltwinder by known procedures of the type disclosed in U.S. Pat. No. 3,755,034, or equivaent and the resulting bundle terminates at its ends in a plurality of annular layers 17, which are secured by band means 15, illustrated as a tape such as nylon or polypropylene.

Endmold 34 is especially fabricated to enable necessary temperature control of the molten thermoplastic resin during casting and the cooling of that resin to form void-free, sound tubesheets 14, 16 which surround and support fibers 13 for substantially the full axial length thereof. As seen in FIG. 3, endmold 34 includes an outer end metallic section 36 for receiving the band end 15 of bundle 12. Bundle 12 is positioned therein such that inwardly projecting pin 38 penetrates aperture 40 located on the longitudinal axis of bundle 12. Both the outer endmold section 36 and pin 38 are fabricated from a material having high heat conductance, for example, aluminum, copper, brass or bronze to facilitate heat removal from the molten resin centrifugally cast into its cavity 40. Endmold 34 also includes a second cavity defining section 42 which surrounds the inner end 37 of metallic section 36, and mold section 42 is fabricated from a material having low heat conductance, for example, polycarbonate, or glass fiber filled polypropylene, epoxy or impact polystyrene. The inner portion 44 of mold section 42 is surrounded by a thick layer of insulation 46 to further retard heat loss from its cavities. Mold section 42 is provided with an inner surface tapered wall 48 which defines the angle of taper on the outer surface 20 of the resultant frusto-tapered portion 25 of the cast tubesheet, FIG. 5. Inner wall 44 defines a cavity 50 which receives the outer wall 52 of jacket 32. Jacket 32 is provided with an axially and radially outwardly extending tapered surface 54 which abuts the radially outwardly extending flange portion 56 to define a cavity 58, which in turn determines the shape and size of disc portion 60 of the resultant tubesheet having peripheral tapered sealing surfaces 18, 19.

The assembly of endmolds 34 on each end of shell 32 to the positions shown in FIG. 3 are then preheated to approximately the melting point of the selected thermoplastic resin, usually in the range of about 100° C.–140° C. Similarly, the thermoplastic resin, the resin container and resin delivery means connecting the resin container and the inlet ports in each end of jacket 32 are heated to a slightly higher temperature than the melting temperature, for example, about 135° C.

The heated assembly and the heated resin container are then placed into the carriage of a centrifugal casting apparatus of conventional type such as that shown in U.S. Pat. No. 2,442,002 such that the resin delivery tubes interconnect the inlet ports of the jacket 32 and the resin container. The centrifuge is started and the speed is raised to selected speed in the range of about 900 to 1400 rpm, and spins the fiber bundle assembly for approximately 25 to 35 minutes. The assembly spins in a horizontal plane and in the apparatus used to produce the elements shown in FIG. 1, the outer end 36 of endmold 34 was approximately 5 inches from the axis of rotation.

After expiration of the normal approximately 2 to 5 minutes for resin penetration between and around fibers 13 and into and filling cavities 58 and 40, cooling air is blown over the rotating centrifuge carriage to aid resin solidification, and after approximately 25 to 35 minutes the centrifuge is stopped and the potted element assembly is removed, and jacket 32 containing solidified tubesheets is disengaged from endmold 34. After cooling the outer ends of the tubesheets are transversely severed to produce frusto-tapered portions 25 which expose the open fiber ends at outer planar surfaces 22, 23.

During cooling, the resin in cavities 58, 40 shrinks radially inwardly from all of the inner walls of endmold 34 and shell 32 which define those cavities. This shrinkage separation may be seen most clearly by comparing FIG. 3 with FIG. 4. FIG. 3 shows bundle 12 and shell 32 in endmold 34 immediately prior to casting the liquid thermoplastic resin into cavities 58, 40. Fragmentary exploded FIG. 4 shows a portion of the inner wall of cavity 58 after solidification of the cast tubesheet, particularly the tapered inner end portions 18 and integral outer frusto-tapered portion 20 which are separated from adjacent molding surfaces 54 and 48, respectively by shrinkage slot 62. Slot 62 may very slightly in width in its circumferential extension around the peripheral edges of the tubesheet 14, but it is substantially uniform. The resultant tubesheet has the external shape of the interior molding surfaces but its solidified volume is about 8% to 15% less than the mold volume depending upon the particular thermoplastic resin selected for use. It will therefore be apparent that while the tapered peripheral surface 18 of solidified tubesheet 14 is parallel to inner tapered wall 54 of shell 32, against which it was in contact in its molten condition, the diameter of taper 18 on the solidified tubesheet is less than the diameter of shell wall 54.

As shown in FIGS. 5 and 6 tapered peripheral surface 18 is mechanically sealed against shell wall 54 to form a fluid tight seal between blood cavity 30 and dialysate cavity 64 as well as from the outside atmosphere. The sealing surfaces 18 and 54 are in engagement for an axial length extending from the inner end surface 66 to its outer end surface 68 of disc portion 60 of tubesheet 14. This sealing engagement results from force exerted against tubesheet 14 axially inwardly in sufficient amount to move tubesheet 60 axially inwardly from its as-cast position, represented by dotted line 70, to its sealed position wherein outer surface 68 is spaced inwardly from the outer end wall 72 of shell 32 for a distance 74 along taper 54.

In the preferred embodiment of the tubesheets 14, 16 which include an outwardly extending portion 20 which is tapered radially inwardly, as shown, the sealing force which causes tubesheet 60 to move axially inwardly into shell 32 is obtained by pressure engagement between taper 20 on the peripheral surface of frusto-conical portion 25 and the tapered inner wall 28 of blood chamber forming means, or header 26. Header 26 is provided with a radially extending flange 76 at the inner end of wall 28 which is engaged by lower wall surface 78 of screw band sealing means 80. As screw band 80 is tightened, or moved axially inwardly along upper wall 86 of shell 32 by engagement of grooves 82 in band 80 with threads 84 on wall 86, a combination of axial and radial pressure is exerted on taper 20 by surrounding tapered wall 28 of header 26. The resiliency, or distortability of wall 28 causes a pressure sealing engagement to occur over the area 24 and this elongated area of contact insures continued maintenance of a fluid tight seal even under pressures sufficient to cause creep of the thermoplastic resin in tubesheet portions 25 or 60. It will be appreciated that tubesheet 60 will form an effective seal between mating tapered surfaces 18 and 54 irrespective of the particular means used to apply the needed axial inward pressure, or force, to cause sealing and that tapered frusto-conical portion 25 may satisfactorily have a peripheral wall taper other than conical up to and including outer walls parallel to the longitudinal axis of shell 32. For tubesheets having an outwardly protruding portion 25 with peripheral surfaces parallel to the longitudinal axis of shell 32 axial force can be applied directly against the outer planar surface which exposes the open fiber ends and for this tubesheet configuration a blood chamber can be formed with a conventional cup-shaped header sealed to the outer planar surface by an O-ring.

As shown in FIG. 1 the inner end taper on peripheral surface 18 extends its full axial length at a single angle from the axis of bundle 12, and that the internal taper 54 in shell 32 likewise extends to the outer end 72 of the shell wall 86, FIG. 6; it will be appreciated however, that satisfactory sealing is obtained when surfaces 18 and 54 have the same taper for only a portion of the length of those tapered surfaces which is adjacent to the axial inner end 66 of disc portion 60. In such a construction, the outer axial portions of the peripheral surface 18 may assume any angle that is desired so long as it is closer to parallelism with the longitudinal axis up to and including parallel. It will be appreciated that disc 60 will solidify to the same taper angle as the angle on molding surface 54 adjacent the outer end 72 of upper shell wall 86 which is employed in the centrifugal casting step, FIG. 3; in this case, taper 54 will extend only for a portion of its total length, as shown in FIG. 6 and the taper will extend axially and radially inwardly only from a point spaced inwardly from end surface 72 of shell 32.

EXAMPLE I

A separatory element as shown in FIG. 1 was made by using a bundle containing approximately 8,000 cellulose acetate fibers approximately 10 inches long, terminating in banded end portions as shown in FIG. 2. A polycarbonate jacket approximately 7.25 inches long and having the internal tapered wall configuration shown in FIG. 3, was treated on its wall surfaces with a thin layer of polytetrafluoroethylene and after assembly of the fiber bundle and jacket into an endmold shown in FIG. 3 the assembly was heated for approximately 2 hours in an oven at 100° C. Concurrently the selected thermoplastic resin of the ethylene vinyl acetate copolymer type, modified as described below, and the resin reservoir and resin delivery tubes were heated to about 135° C. in an oven in approximately 2 hours. The resin composition was a mixture, in percent by weight, of: 29% ethylene-vinyl acetate copolymer containing 17.5–18.5% vinyl acetate and available commerically from DuPont under the trademark Elvax 410; 9% of ethylene-vinyl acetate-acid terpolymer containing 24–26% vinyl acetate and commercially available from DuPont under the trademark Elvax 4320; 42% microcrystalline polywax, understood to be a homopolymer of ethylene having a molecular weight of approximately 700 and available commercially under the trademark BARECO 655 from Petrolite Corporation; and 20% of a polyterpene tackifier with a soltening point of 115° C. and available commercially from Hercules, Incorporated under the trademark Piccolyte A 115. This composition had a viscosity of about 1400 cps at 130° C. and about 1250 cps at 135° C.

The heated endmold-jacket assembly and resin reservoir were positioned in the centrifuge carriage to horizontally spin the approximately 10″ long assembly at a rotation speed between 1,000 and 1,200 rpm. After about 5 minutes, an air blower supplied room temperature air into the circulating centrifuge and after 30 minutes the centrifuge was stopped and the cast tubesheets in the jacket were removed from the endmolds and severed transversely slightly inwardly from the inner end surface of the bands.

The resulting element was sealed into the jacket using the header and screw band to axially force tubesheet 60 into sealing engagement with jacket wall 54 and simultaneously form blood chamber 30.

A number of different thermoplastic resins have been successfully used in the method of this invention and all have been modified ethylene-vinyl acetate copolymer based compositions. As a general guide to selecting specific compositions it is desirable to use a single ethylene-vinyl acetate copolymer, or a mixture of same, having a composite melt index in the range of 300–400 as determined by the method of ASTM D 1238, and further desirable to avoid use of ethylene-vinyl acetate copolymers having a shore hardness less than about 72 as determined by the method of ASTM D 2240; additionally the softening point of the ethylene-vinyl acetate copolymer is preferably in the range of 190° F.–210° F. as determined by the method of ASTM E 28.

The copolymer viscosity is substantially reduced to enable fiber penetration by modification to include a microcrystalline polywax of the ethylene homopolymer type and the amount employed can be varied upwardly in the range of about 20% to about 60% of the total composition, as needed, for centrifugal casting temperatures below about 110° C. to accommodate fibers which cannot withstand preheating above about 100° C., and similarly the amount needed can be adjusted downwardly where higher casting temperatures can be employed. Resins that are suitable may have a viscosity as low as 100 centipoises and as high as 5,000 centipoises at a temperature of 150° C. or less. The use of the higher viscosity resins requires higher quantities of the microcrystalline wax component to insure fiber penetration.

A further component to improve adhesion of the resin and fiber, is satisfactorily any of the polyterpene resins derived from alpha-pinene having softening points above about 100° C.–110° C. and the composition may contain about 15% to 30% of the total composition of such resins.

EXAMPLE II

Another element of the FIG. 1 type was made using the same jacket steps and apparatus recited above in Example I but employed a bundle of cellulose fibers made by the process of deacetylating cellulose acetate disclosed in U.S. Pat. No. 3,546,209. The endmold, jacket and fibers were preheated to 140° C. and the selected resin, resin pot and resin delivery tubes were preheated to 170° C. The resin composition was a mixture, in weight percent, of 34% Bareco 655, 29% Piccolyte A 115, 29% Elvax 4320 and 8% Elvax 150. This resin composition had a viscosity at 170° C. of about 1,000–1,100 centipoises.

What is claimed is:

1. A separatory element comprising a bundle of continuously hollow semipermeable fibers, said bundle comprising a plurality of elongated fibers having a central portion and two opposite terminal portions, a solidified castable resin tubesheet on each said terminal portion joining the exteriors of said fibers to each other, each said tubesheet having an axially extending disc portion integral with an outer frusto-tapered portion tapering axially outwardly and radially inwardly from the axial outer surface of said disc portion and terminating in an outer end planar surface, said fibers extending through said disc portion and said frusto-tapered portion of said tubesheet and terminating in open ends lying in the outer end planar surface of said frusto-tapered portion, at least a portion of said disc adjacent its axial inner end having a peripheral surface tapering radially and axially outwardly from said inner end.

2. A separatory element comprising a bundle of continuously hollow semipermeable fibers, said bundle having a central portion and two opposite terminal portions, each said portion being curvilinear in cross section and said terminal portions having a larger curvilinear cross section than said central portion, a solidified castable resin tubesheet on each said terminal portion joining the exteriors of said fibers to each other, said tubesheet having an inner disc portion integral with an outer frusto-tapered portion, said inner disc portion extending axially inwardly of said frusto-tapered portion and including an annular rim portion surrounding said fibers with said solidified castable resin lying radially outwardly from said fibers, said rim portion being substantially free of said fibers, at least a portion of said disc adjacent its axial inner end having a peripheral surface tapering radially and axially outwardly from said inner end, and said frusto-tapered portion tapering axially outwardly and radially inwardly from the axial outer surface of said disc portion and terminating in an outer end planar surface exposing the open ends of said fibers, said fibers therein extending axially and substantially to the peripheral edges of said frusto-tapered portion at said outer end planar surface.

3. An element in accordance with claim 2 wherein said frusto-tapered portion is frusto-conical 4. An element in accordance with claim 1 wherein said disc portion is circular in cross section.

5. An element in accordance with claim 1 wherein said disc portion is lenticular in cross section.

6. An element in accordance with claim 2 wherein the angle of taper of the peripheral surface of said frusto-tapered portion is different from the angle of taper of the peripheral surface of the inner axial portion of said disc portion of said tubesheet.

7. An element in accordance with claim 1 wherein said solidified castable resin is thermosetting.

8. An element in accordance with claim 1 wherein said solidified castable resin is thermoplastic.

9. A separatory device comprising a shell defining a dialysate chamber having spaced apart inlet and outlet ports and a blood chamber attached to each end of said shell, a bundle of continuously hollow semipermeable fibers arranged in substantially axial array in said shell and terminating adjacent each end thereof in a solidified castable resin tubesheet joining said fibers to each other, said tubesheet having an axially extending disc portion terminating in an outer end planar surface exposing the open ends of said fibers therein, at least a portion of said disc adjacent its axial inner end having a peripheral surface tapering radially and axially outwardly from said inner end, said shell having integral sealing means adjacent each end of said shell for sealing each said disc-shaped portion of said tubesheet to said shell at a location adjacent each end thereof, said internal sealing means comprising a tapered portion of the inner wall of said shell extending axially inwardly and radially inwardly to thereby provide an interference sealing surface for pressure engagement contact with said tapered peripheral surface of said disc portion, and means urging said disc portion axially inwardly into sealing engagement with said inner tapered surface of said shell to form a fluid-tight seal between said shell and said disc portion.

10. A separatory device in accordance with claim 9 wherein said tapered portion of the inner wall of said shell extends axially inwardly and radially inwardly from a point spaced inwardly from the outer end of said shell.

11. An artificial kidney comprising a shell substantially circular in cross section defining a dialysate chamber having spaced apart inlet and outlet ports and a blood chamber attached to each end of said shell, a bundle of continuously hollow semipermeable fibers arranged in substantially parallel array in said shell and terminating adjacent each end thereof in a solidified castable resin tubesheet joining said fibers to each other, said tubesheet having an axially extending disc portion integral with a frusto-conical portion extending axially outwardly from said disc portion, at least a portion of said disc portion adjacent its axial inner end having a peripheral surface tapering radially and axially outwardly from said inner end, and said frusto-conical portion terminating in an outer end planar surface exposing the open ends of said fibers therein, said shell having internal sealing means adjacent each end of said shell for sealing each said disc-shaped portion of said tubesheet to said shell at a location adjacent each end thereof, said internal sealing means comprising a tapered portion of the inner wall of said shell extending axially inwardly and radially inwardly to thereby provide an interference sealing surface for pressure engagement contact with said tapered peripheral surface of said disc portion, and means urging said disc portion axially inwardly into sealing engagement with said inner tapered surface of said shell to form a fluid-tight seal between said shell and said disc portion.

12. An artificial kidney in accordance with claim 11 wherein said tapered portion of the inner wall of said shell extends axially inwardly and radially inwardly from a point spaced inwardly from the outer end of said shell.

13. An artificial kidney in accordance with claim 11 wherein said solidified castable resin is thermoplastic.

* * * * *